Feb. 11, 1958  C. R. ALDEN  2,822,963
CONTAINER PANEL STRUCTURE
Filed Jan. 15, 1952  6 Sheets-Sheet 1
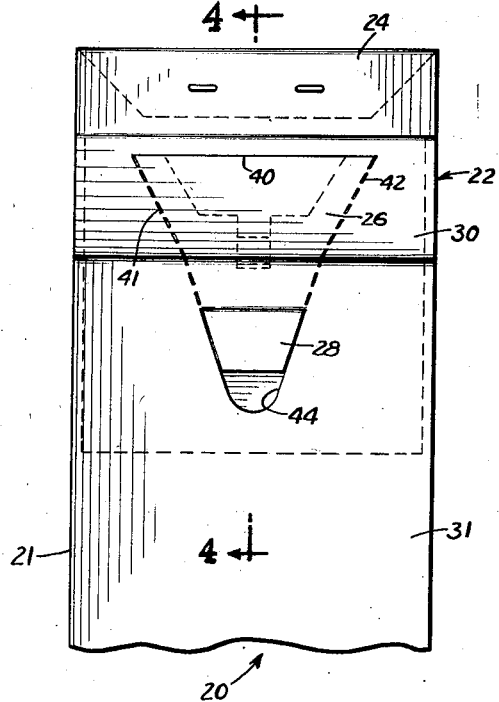
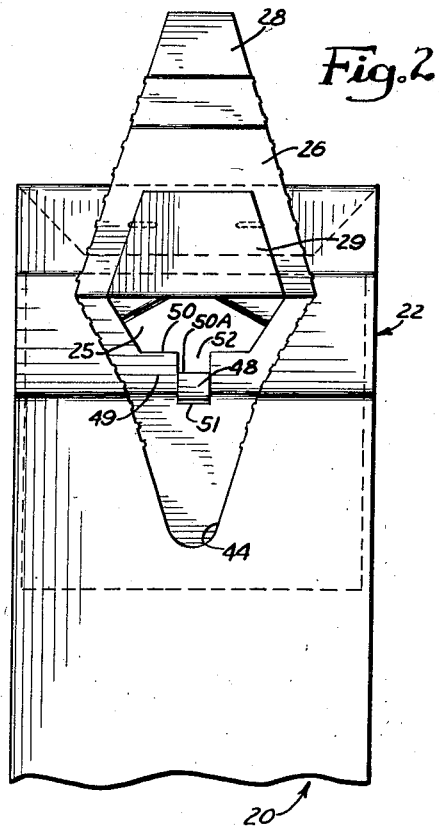
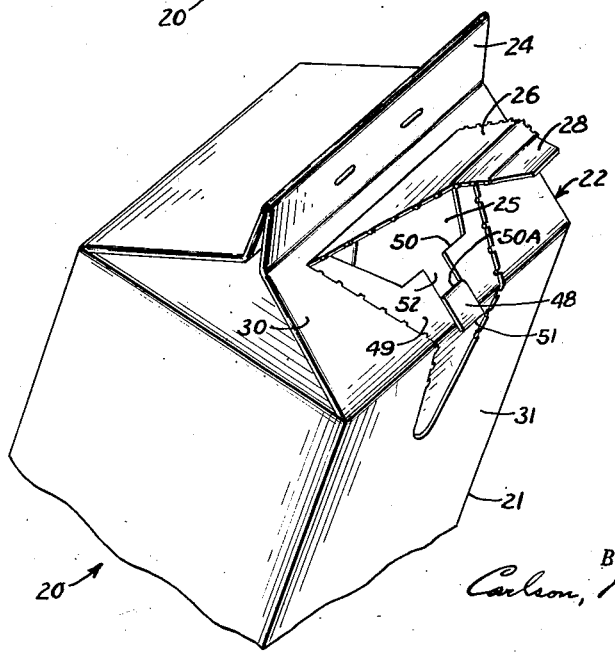
INVENTOR.
Carroll R. Alden
BY
Carlson, Pitzner, Hubbard & Wolfe
Attys.

Feb. 11, 1958 C. R. ALDEN 2,822,963
CONTAINER PANEL STRUCTURE
Filed Jan. 15, 1952 6 Sheets-Sheet 2
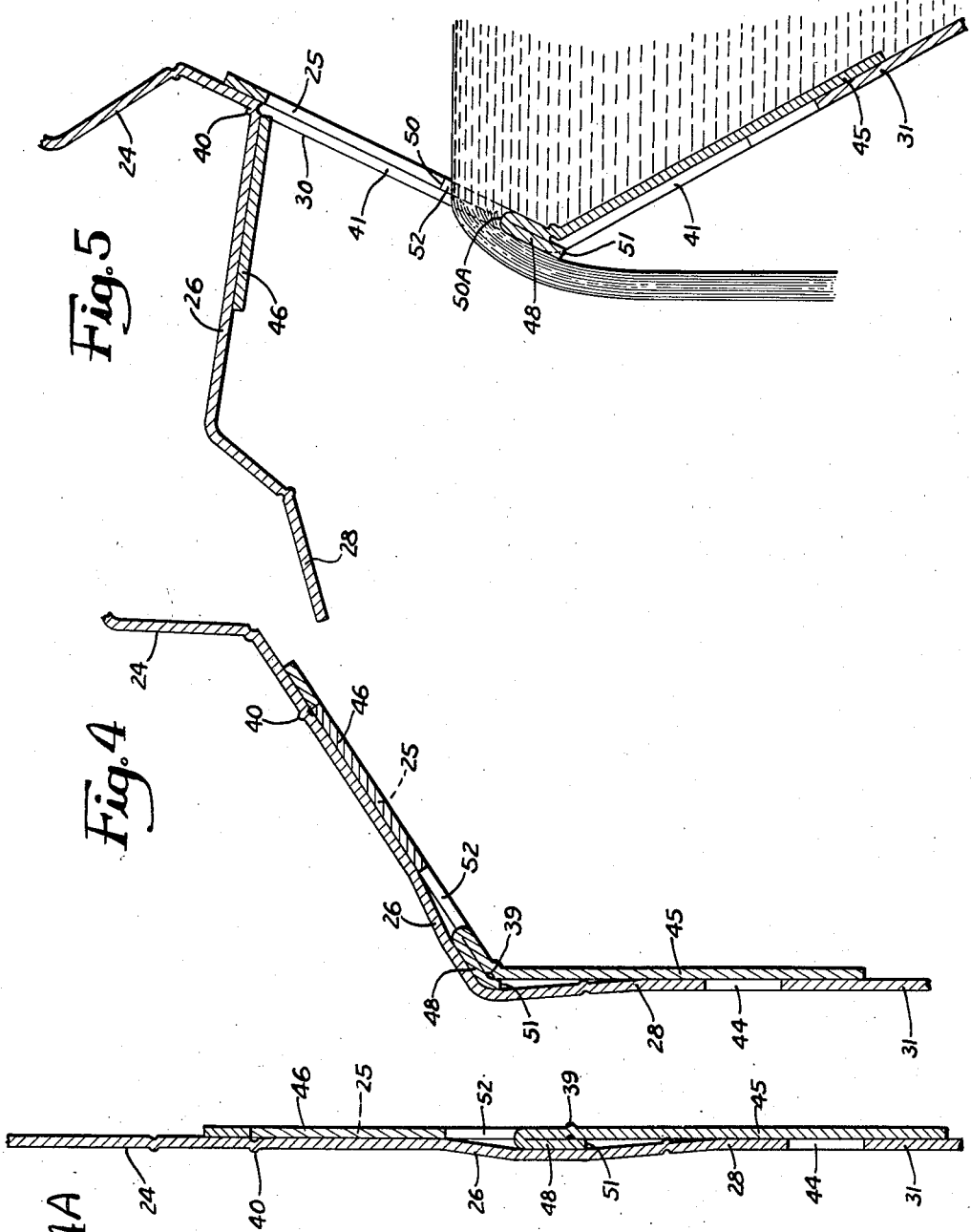
INVENTOR.
Carroll R. Alden
BY
Carlson, Pitzner, Hubbard & Wolfe
Attys.

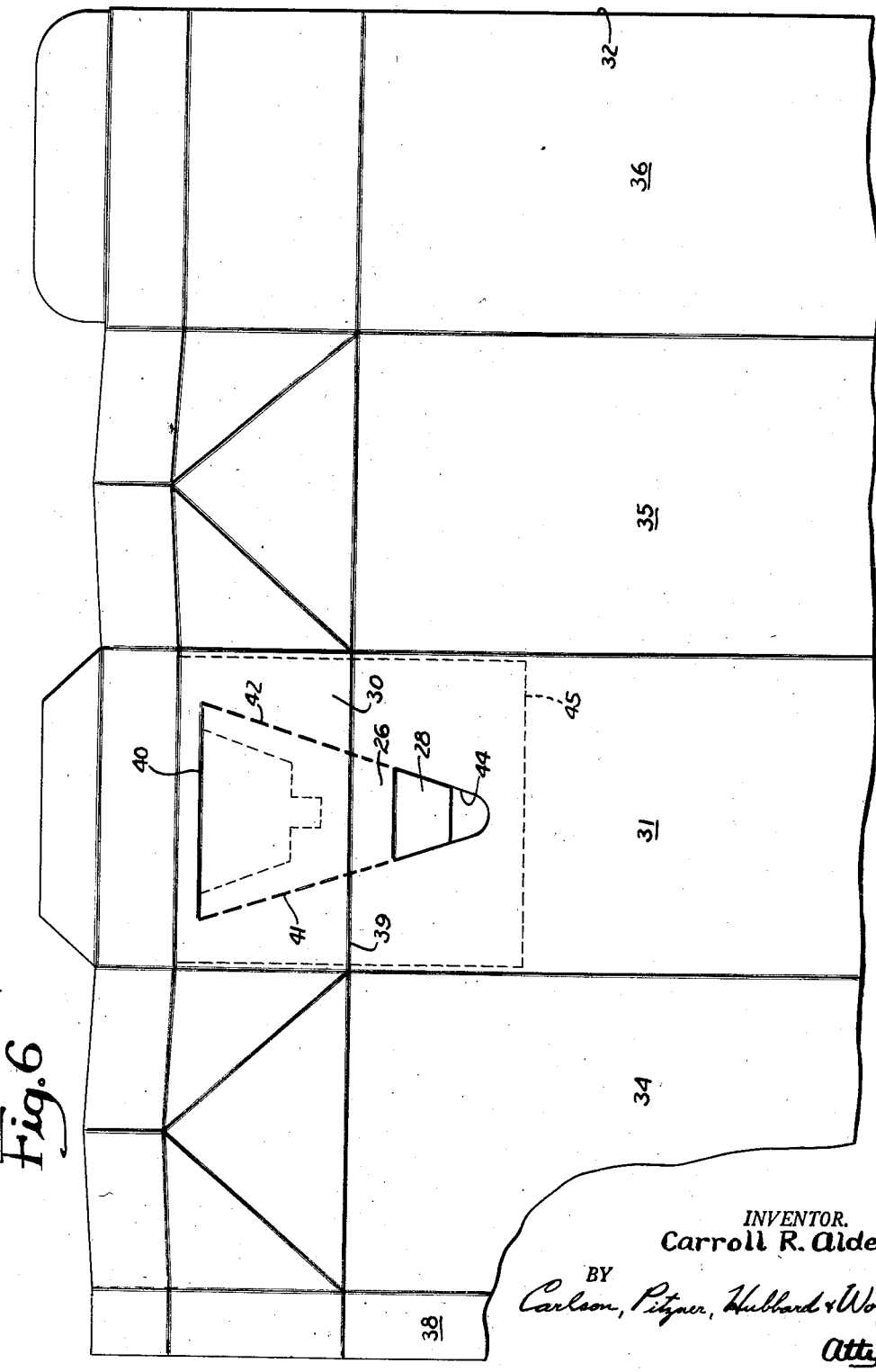

Feb. 11, 1958 C. R. ALDEN 2,822,963
CONTAINER PANEL STRUCTURE
Filed Jan. 15, 1952 6 Sheets-Sheet 4
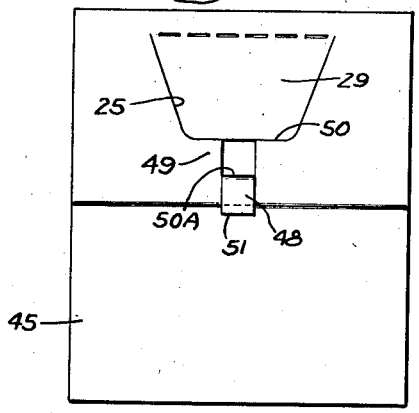
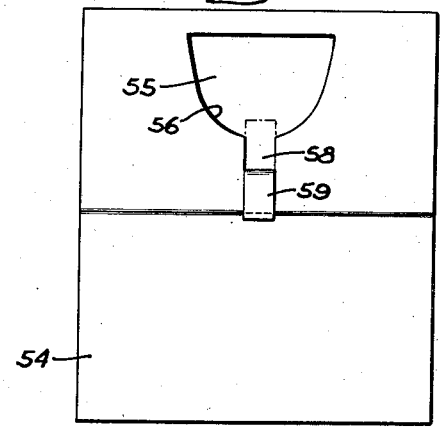
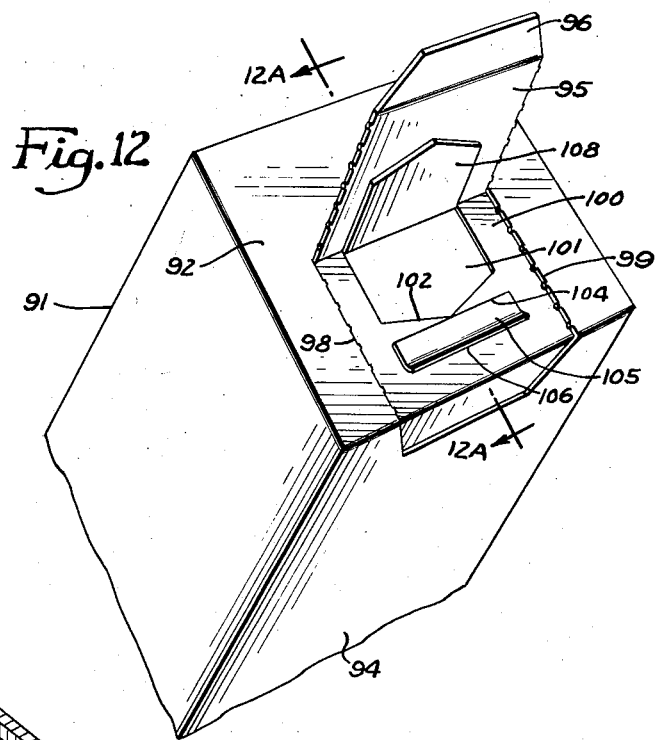
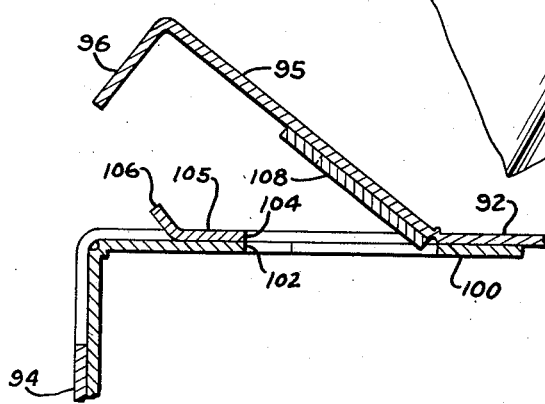
INVENTOR.
Carroll R. Alden
BY
Carlson, Pitzner, Hubbard & Wolfe
Attys.

Feb. 11, 1958 C. R. ALDEN 2,822,963
CONTAINER PANEL STRUCTURE
Filed Jan. 15, 1952 6 Sheets-Sheet 5
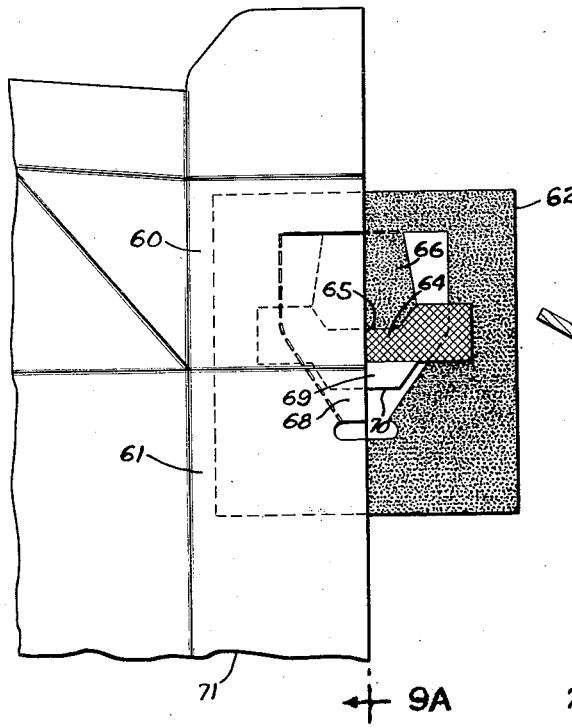
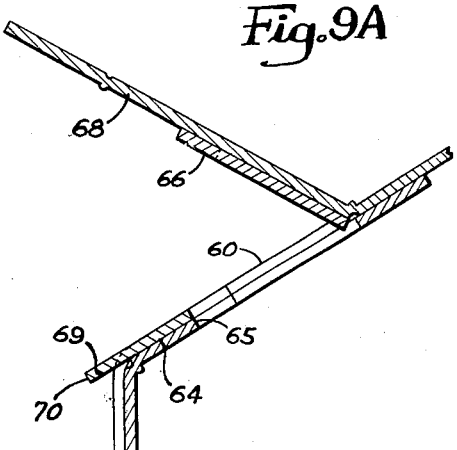
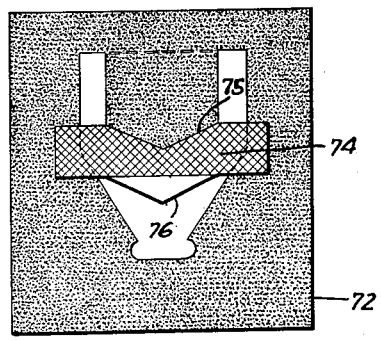
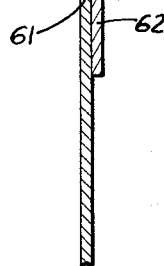
INVENTOR.
Carroll R. Alden
BY
Carlson, Pitzner, Hubbard & Wolfe
Attys.

Feb. 11, 1958   C. R. ALDEN   2,822,963
CONTAINER PANEL STRUCTURE
Filed Jan. 15, 1952   6 Sheets-Sheet 6

INVENTOR.
Carroll R. Alden
BY
Carlson, Pitzner, Hubbard & Wolfe
Attys.

United States Patent Office 2,822,963
Patented Feb. 11, 1958

2,822,963

CONTAINER PANEL STRUCTURE

Carroll R. Alden, Detroit, Mich., assignor to Ex-Cell-O Corporation, Detroit, Mich., a corporation of Michigan Application January 15, 1952, Serial No. 266,572

10 Claims. (Cl. 222—530)

The present invention relates generally to the field of packaging and, more specifically, to a novel panel structure of the general type disclosed in copending application Serial No. 321,217 of Francis E. Makuta, filed November 18, 1952, such structure being adapted for incorporation into containers of bendable sheet material, or the blanks therefor, to improve the dispensing or pouring characteristics of such containers when completed.

The invention finds particular, but not exclusive, utility when applied to containers or blanks of bendable sheet material each including an upper planar panel having a pouring opening therein and, in the completed container, subtending an arc of at least 90 degrees with a lower planar panel separated from said upper planar panel by an angular corner. Containers and blanks of this description are exemplified in U. S. Patents No. 2,288,914 issued July 7, 1942, on the application of Charles Z. Monroe, and No. 2,263,957 issued November 25, 1941, on the application of Walter E. Sooy. The invention is also applicable to the construction of flat top containers and blanks of paperboard or the like, as exemplified in my copending application, Serial No. 269,785, filed February 4, 1952, now Patent No. 2,763,424, issued September 18, 1956.

An important object of the present invention is to provide a container panel structure of the character set forth and including fluid dispensing means capable of pouring and cutting off sharply, without permitting dribbling of poured fluid down the side of the container.

Another object is to provide a panel structure for incorporation into a container to give the same dribble-proof pouring characteristics without regard to the size or rate of flow of the dispensed stream, the inclination of the container, or the degree of skill of the individual who may be handling the container.

A further object is to provide a panel structure of the foregoing type and wherein the dribble-proof pouring means will be readily susceptible of complete sanitary protection.

Still another object is to provide a container panel structure adapted to fulfill the foregoing objectives at minimum cost and without interference with the stacking and packing characteristics of the blanks into which it may be incorporated.

Other objects and advantages will become apparent as the following detailed description proceeds, taken together with the accompanying drawings, in which:

Figure 1 is a fragmentary front elevation of an illustrative gable top container having a panel structure embodying the present invention.

Fig. 2 is a view similar to Fig. 1 but showing the container with the lift tab in elevated position so as to expose the dispensing opening.

Fig. 3 is a fragmentary perspective view detailing the upper portion of the container illustrated in Figs. 1 and 2 with the same in inclined position incident to pouring.

Fig. 4 is an enlarged fragmentary vertical sectional view taken through the illustrative container of Fig. 1 and in the plane of line 4—4.

Fig. 4A is a view similar to Fig. 4 but showing the novel panel structure of the container in substantially coplanar position prior to erection of the container.

Fig. 5 is a vertical sectional view similar to Fig. 4 but showing the lift tab in elevated position and the container inclined for pouring from the dispensing opening.

Fig. 6 is a fragmentary plan view showing the outside face of the blank from which the container of Fig. 1 may be constructed.

Fig. 7 is a plan view showing the outside or front face of the pouring opening patch which lies against the inside face of the blank of Fig. 6.

Fig. 8 is a view similar to Fig. 7 but shows a slightly modified form of pouring opening patch.

Fig. 9 is a fragmentary plan view of the outside face of a container blank having a slightly modified form of panel structure also embodying the present invention.

Fig. 9A is an enlarged fragmentary vertical sectional view through a container having the modified panel structure shown in Fig. 9, such view being taken in a plane corresponding to the line 9A—9A of Fig. 9.

Fig. 10 is a view similar to Fig. 9A but illustrates a pouring opening patch for a further modified form of panel structure also embodying the invention.

Fig. 12 is a fragmentary perspective view showing a flat top container having a panel structure similar to that illustrated in Fig. 11.

Fig. 12A is an enlarged fragmentary vertical sectional view through the container of Fig. 12, such view being taken in a plane indicated by the line 12A—12A.

Figure 11:
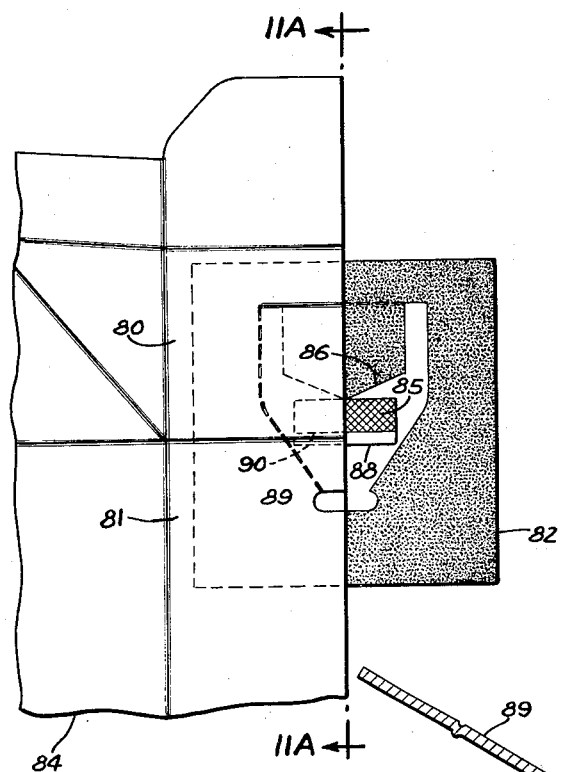
Figs. 11 and 11A are views similar to Figs. 9 and 9A, respectively, but illustrate a container and blank having still another modified form of panel structure embodying the present invention.

While the invention is susceptible of various modifications and alternative constructions, certain preferred embodiments have been shown in the drawings and will be described below in considerable detail. It should be understood, however, that there is no intention to limit the invention to the specific forms disclosed, but on the contrary, the intention is to cover all modificactions and alternative constructions falling within the spirit and scope of the invention as expressed in the appended claims.

Referring more specifically to the drawings, there is shown in Figs. 1 to 3 an illustrative container 20 having a panel structure embodying the present invention. The container 20 is formed from paperboard or other bendable sheet material and is self-sustaining in shape, being coated or impregnated with an appropriate substance to render it fluidtight and capable of holding liquids such as milk. In general, the container 20 comprises a tubular body 21 of substantially square cross-section, together with a top end closure 22 and a bottom end closure (not shown) which may be of any well-known form. The top end closure is surmounted by a central laminar rib 24 and is known in the packaging field as a "gable top." The top end closure 22 includes a sanitarily protected pouring opening 25 which is normally covered by a lift tab 26 terminating in an easily loosened gripping tongue 28. The pouring opening 25 has an outboard edge which serves as one of its boundaries and pouring normally takes place over such outboard edge. The lift tab 26 may have mounted thereon a reclosure plug 29 adapted to snap back into the pouring opening 25 and yieldably maintain the tab 26 in closed position after initial opening of the same. The pouring opening 25 is locacted in an upper planar panel 30 normally situated above the filling line of the container and is adapted to dispense fluid down past a lower planar panel 31 separted from the panel 30 by an angular corner, the inside faces of the two panels together subtending an arc which in this instance is something over 90 degrees.

The container 20 is preferably fashioned from a flat blank 32 of paperboard or the like, the outside face of which is shown in Fig. 6. By means of an appropriate pattern of score lines, the blank 32 is divided into a plurality of panels and areas which are utilized for the walls of the container and the closure parts of the same when it is erected. For present purposes, it will suffice to note that the central and major area of the blank is scored to define therein container body side panels 34, 31, 35, 36, and in this instance a glue flap 38. The upper ends of these panels are defined by a common, laterally extending score line 39 separating them from end panels and fractional panel areas which comprise the parts for the top closure of the container 20. In this connection it might be noted that the score line 39 separates the inclined roof panel 30 from the side panel 31 and defines the angular corner along which these two panels are connected. As indicated in Figs. 1 and 6, the main ply or thickness of the blank 32 contains the lift tab 26 and the gripping tongue 28, these being defined by a scored hinge line 40 and weakened severance or perforation lines 41, 42, the latter having fully severed portions at the extremities of the gripping tongue 28 and being connected below the same by an arc defining a finger recess 44 for initially lifting the gripping tongue. The pouring opening 25, reclosure plug 29, and the surrounding sanitary marginal area are defined in this instance by a patch 45 (Fig. 7), the front face of which is secured adhesively to the inside face of the blank 32. Alternatively, the pouring opening and its surrounding marginal area may be defined by a panel extension integral with the main ply of the blank, as shown in Sooy Patent No. 2,263,957, supra.

Heretofore, the pouring characteristics of containers constructed as shown in the foregoing patents, or after the general pattern described thus far herein, have not been wholly satisfactory. When pouring slowly and at low angles of inclination, as when the container is substantially full, the poured fluid has a tendency to wet the surface of the container beneath the pouring opening. If this condition occurs, the poured fluid is apt to creep down past the line of demarcation between the pouring opening panel and the underlying side wall panel, thence dribbling down the front face of the container. This not only makes it difficult to direct the poured stream toward a predetermined target but also results in soiling the table or any underlying surface over which the container may be held or upon which it may eventually be rested. These difficulties are, of course, more acute when pouring fluids such as milk, cream, or oil which have a marked tendency to wet the surface of the vessel beneath the pouring opening.

Two primary factors affecting the pouring characteristics of such containers are, first, the velocity of the poured stream at the time it reaches the point or region of separation from the container, and, second, the relative strengths of the gravity and adhesion forces at such point or region of separation. As to the first factor, if the stream velocity at the separation point is high, there will be a tendency to effect clean separation regardless of how large or how small such stream may be. This factor is particularly important when pouring is being started from a relatively full container. As to the second factor, if the effect of gravity on the poured stream at the point of separation is greater than the effect of the adhesion forces tending to make the liquid cling to the container, there will be a clean separation between the poured liquid and the container, both at the initiation and at the conclusion of pouring. If, on the other hand, the effect of gravity acting on the poured stream is not greater than effect of the adhesion forces between the stream and the surface of the container, there will be no parting at the desired separation point and the poured stream will flow untidily down the front of the container.

With the foregoing observations in mind, the novel panel structure mentioned briefly above has been incorporated into the container 20 and its blank 32, leading to phenomenally satisfactory pouring characteristics under even the most adverse conditions. Referring to Figs. 2 to 7, inclusive, it will be perceived that a pouring lip 48 is mounted on weir 49 of the pouring opening panel 30 below the crest or sill 50 of such weir. The pouring lip 48 is fixed to the weir 49 by means of its upstream portion and thus terminates in a free downstream edge 51 disposed in spaced apart relation with the panel 30 as well as with the panel 31. In this instance, the downstream edge 51 is situated outside the perimeters of the adjacent panels 30, 31 of the container 20 and extends beyond the corner line of demarcation between such panels.

The pouring lip 48 may be constructed in a variety of ways and in this case happens to be integral with the patch 45, being defined by a reversely bent portion of the patch 45 (see Figs. 4, 4A, 5 and 7). After the lip 48 has been reversely bent, the patch 45 is adhesively mounted on the inside face of the blank 32, the pouring lip 48 being sandwiched between the front face of the patch 45 and the inside face of the blank, as indicated in Fig. 4A. Precautions are taken, however, to preclude adhesive from binding the rear face of the lip 48 to the front face of the patch, particularly in the region of the free downstream edge 51. Because of its almost negligible thickness and ability to fold flat, the lip 48 in no way interferes with the stacking or packing characteristics of the blank 32.

The lip 48 is sufficiently pliable to deform as the blank 32 is erected into a finished container, bending from the flat position shown in Fig. 4A to the flexed position shown in Fig. 4. To adapt the lip 48 to such behavior and insure that it will be in proper position upon elevation of the lift tab 26 incident to pouring, the lip 48 is made of relatively resilient material. Consequently, as the tab 26 is lifted, the pouring lip 48 springs from its flexed position shown in Fig. 4 to a position such as that illustrated in Fig. 5 wherein the downstream edge 51 is well clear of the underlying side panel 31 of the container.

With the pouring lip 48 in working position and the container 20 in the pouring position shown in Figs. 3 and 5, the stream of fluid dispensed from the pouring opening 25 will travel down along the pouring lip 48, parting from the latter at the free downstream edge 51. Because the edge 51 is disposed in spaced relation with the pouring opening panel 30 and the adjacent underlying side panel 31, it will be appreciated that the only possible way for fluid to wet the side panel 31 would be to reverse its direction abruptly and flow upward from the edge 51 along the adjacent upwardly inclined rear face of the pouring lip. Such an abrupt reversal of flow could only occur if the effect of the adhesion forces on the fluid of the poured stream were substantially greater than the effect of gravity on such fluid. By reason of the structure just described, however, the gravity effect on the poured fluid at the edge 51 always exceeds the effect of the adhesion forces, even at low rates of flow and only slight inclination of the container 20.

For the purpose of further enhancing the satisfactory pouring characteristics of the container 20, it has been found expedient to provide relief in the crest or sill 50 of the pouring opening weir 49. In the present instance, such relief is in the form of a relatively deep central notch 52 (Figs. 2, 3, 5 and 7), giving the weir sill 50 a central offset 50A coincident with the bottom of the notch 52. The notch 52 itself is conveniently defined by the area occupied by the pouring lip 48 prior to severance and reverse bending of the same.

The foregoing structural arrangement insures that pouring, especially at low rates as during initiation or conclusion of pouring from a relatively full container, will take place over the central portion of the weir and in line with the pouring lip 48 and its free downstream separation edge 51. Such structure also results in the highest possible velocity of the poured stream at the time it reaches the separation edge 51, however small such stream may be. This is achieved, to a large extent, by taking advantage of the relationship between the surface tension of the fluid and its tendency to adhere to the sill of the weir. When fluid is poured over a weir having a relieved sill, and particularly one which has been deeply and narrowly notched, as in the present case, the surface tension and adhesion effects cause an appreciable hydraulic head to be built up on the weir before flow commences over its sill. Consequently, the poured stream possesses the highest possible velocity at the time it reaches the separation edge 51. A narrow and deep stream, such as that produced by the notch 52, will have a substantially higher velocity than a wide and shallow stream with large contact area and correspondingly high flow resistance. Because the velocity of even a very small stream is high at the separation edge 51, the container 20 initiates and cuts off pouring with nicety and precision, even permitting the user to pour as little as a drop at a time should he so desire.

At high rates of flow, as when the container is tilted much more steeply than shown in Figs. 3 and 5, the poured stream not only fills the notch 52 but covers the entire offset sill 50 of the weir and fills in a good portion of the area of the pouring opening 25. Under these conditions, there is little, if any, tendency of the fluid to dribble down the sidewall panel 31 of the container. The main source of potential difficulty under such circumstances is the possibility that the pouring opening of the container will become so nearly filled by the large fluid stream that the orderly flow of air into the container will become disrupted, causing gurgling and unruly pouring. This source of difficulty is substantially eliminated in the container 20 by making the pouring opening 25 generally trapezoidal in shape and with a lateral dimension increasing progressively toward the top of the container. Accordingly, such opening is of sufficient size to admit a substantial flow of air and avoid gurgling during the steepest inclination of the container which might be expected in normal usage.

Turning now to Fig. 8, there is shown a slightly modified form of patch 54 adapted for attachment to a blank similar to the blank 32 and ultimate incorporation into a container similar to the container 20. The patch 54 in general resembles the patch 45 already described, differing primarily in the shape of its pouring opening 55 and in the absence of a reclosure plug. The patch 45, which may of course be fashioned as a subpanel integral with the main ply of its associated blank, has an arcuate lower edge 56 defining the crest or sill of the pouring weir. The edge or sill 56 is relieved by means of a central notch 58 similar to the notch 29. The notch 58 is defined by a portion of the area occupied by a reversely bent pouring lip 59 prior to severance and reverse bending of the same. The lip 59 resembles the pouring lip 48 and behaves in a similar manner.

Referring next to Figs. 9 and 9A, a modified panel structure also embodying the invention is there shown comprising adjacent planar panels 60, 61, a pouring opening patch 62 which may be in the form of an underlying subpanel, and a pouring lip 64 adapted to be traversed by the poured fluid. In this instance, the pouring lip 64 is fashioned from a strip of relatively thin, resilient material in the nature of cellulose acetate or Celluloid. The lip 64 has a centrally relieved upstream edge portion 65 in the form of a relatively wide and substantially U-shaped notch coinciding approximately with the relieved sill of the weir adjacent the pouring opening, the latter being initially filled by reclosure plug 66 which is bound adhesively to lift tab 68. The lip 64 also has an offset downstream edge portion 69 terminating in a free downstream separation edge 70. The lateral or horizontal dimension of the downstream edge portion 69 is slightly less than that of the corresponding portion of the lift flap 68. Preferably, a major area of rear face of the lip 64 is secured adhesively to the front face of the pouring opening patch 62, the right half of such area being indicated by the double cross hatching in Fig. 9, prior to mounting of the patch 62 on the container blank 71. The front face of the patch 62 is thereupon adhesively bonded to the inside face of the blank 71 over a substantial area, the right half of which is indicated by the stippled area in Fig. 9. The arrangement is such that no adhesive is applied to either face of the downstream edge portion 69 of the pouring lip 64 so that, upon erection of the container, the portion 69 flexes readily against the side panel 61 but, upon elevation of the lift flap 68, springs to the extended or substantially unflexed condition illustrated in Fig. 9A. In such condition, the free downstream edge 70 of the pouring lip 64 is disposed in spaced relation with both the panel 60 and the panel 61, being located outside the perimeter of each. In operation, the modified panel structure and pouring lip 64 behave in much the same manner as the panel structure and pouring lip 48 described earlier herein.

Fig. 10 discloses a further modified form of pouring opening patch 72 and pouring lip 74, both similar in construction to the patch 62 and lip 64 just described. The principal point of difference resides in the specific shape of the weir sill and the upstream and downstream edges 75, 76, respectively, of the pouring lip. In this instance, the sill of the pouring opening weir and the adjacent coinciding upstream edge 75 of the lip 74 are of substantially shallow V-shape. The downstream edge 76 bears a similar shape and, after initial elevation of the container lift flap, is disposed in spaced relation with its associated pouring opening panel and underlying side panel of the container. In furtherance of this objective, the rear face of the lip 74 is adhesively secured to the patch 72 over the area indicated by the double cross hatching in Fig. 10, the area adjacent the downstream edge 76 being maintained free of adhesive. The patch 72 with the lip 74 mounted thereon may then be secured to the inside face of the blank by an adhesive juncture coinciding with the stippled area indicated in Fig. 10.

Figure 11A:
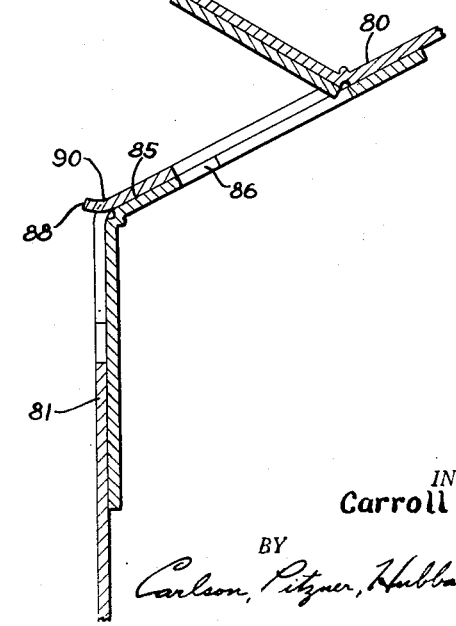

Turning now to Figs. 11 and 11A, there is shown still another modified embodiment of the invention in the form of a panel structure comprising a pouring opening panel 80, an adjacent underlying side panel 81, a pouring opening patch 82 or subpanel integral with blank 84 and closely similar to the patch shown in Fig. 10, together with a different form of pouring lip 85. The latter comprises a generally rectangular strip of resilient material, such as Celluloid, adhesively secured to the pouring opening weir immediately below the shallow V-shaped weir sill 86. This adhesive juncture is confined to an area, the right hand half of which is shown by double crosshatching in Fig. 11, leaving the downstream edge 88 of the lip 85 and its adjacent marginal edge portion free. The lip 85 is also dimensioned and located on the patch 82 so that the longitudinal extremities of the lip 85 will fall beneath the lift tab 89 and will not be included in the adhesive juncture between the patch 82 and the inside face of the blank 84.

As thus far described, the free downstream edge 88 of the pouring lip 85 is, upon elevation of the lift flap 89, disposed in spaced relation to the panels 80, 81 and is located outside the perimeter of each. However, the adhesive effect resulting from paraffin coating of the container incident to erection of the same from the flat blank 84 tends to make the free downstream edge portion of the lip adhere to the front face of the panel 81 in opposition to its resiliently stressed condition. For the purpose of enabling the lip 85 to better resist such effect, it has been found desirable to put an upward crimp or bend 90 in the marginal area of the lip 85 adjacent its free downstream edge 88. Such a crimp is preferably imparted to the lip 85 by heated rolls or a heated die so as to give the lip a permanent set without interfering with its resiliency when deformed or reversely bent under the lift flap 89. Crimping of the lip 85 also makes it possible to fabricate the same out of thinner sheet stock than might otherwise be necessary.

In Figs. 12 and 12A, there is shown still another modified panel structure which illustratively embodies the present invention. In this instance, such modified panel structure has been incorporated into a flat top container 91 rather than a gable top container but is constructed of similar material to that used in the container 20. The modified panel structure comprises a pouring opening panel 92, together with an adjacent underlying sidewall panel 94, both such panels being separated by an angular corner and subtending an arc of approximately 90 degrees. The pouring opening panel 92 includes a hinged lift tab 95 having a gripping tongue 96, such parts being defined in part by severance lines 98, 99 in the outer ply of the panel 92 and which permit the flap 95 to tear away at its lateral edges when lifted by means of the tongue 96. Sandwiched to the inside face of the outer ply of the panel 92 is a pouring opening patch 100 which may be a separate piece or may alternatively be formed as a subpanel integral with the blank out of which the container 91 is made. The patch 100 is closely similar to the pouring opening patch 82 described earlier herein and includes a pouring opening 101 having a pouring edge 102 of shallow V-shape and which defines the relieved sill of the pouring opening weir. Between the pouring edge 102 and the angular corner defining the top of the sidewall panel 94 there is mounted a resilient pouring lip 104 closely similar to the lip 85 shown in Figs. 11 and 11A. Accordingly, the lip 104 is formed with an upward crimp 105 and terminates in a free downstream edge 106 which, upon elevation of the lift tab 95, springs into spaced relation with the pouring opening patch 100 and the panel 92. In this position, the edge 106 serves as a separation edge for the fluid dispensed from the opening 101. In the present instance, the downstream edge 106 of the pouring lip 104, while located in spaced relation with, and outside the perimeter of, the panels 92, 94, does not overhang the angular corner which separates the panels 92, 94. It will be appreciated, however, that the lip 104 could easily be mounted in a position where its downstream edge portion 106 would overhang such angular corner and that it would operate in such position as well as in the position illustrated in Figs. 12 and 12A. In addition to the parts already described, the pouring opening panel 92 may also include a reclosure plug 108 adapted to be snapped into the pouring opening 101 and to be adhesively secured to the inside face of the lift tab 95.

What is claimed is:

1. A panel structure for a container of paperboard or the like which is self-sustaining in shape, said panel structure comprising the combination of two adjacent planar panels defined at least in part by an inner ply and an outer ply common to both, said panels being separated by a common score line and their inside faces subtending an arc of at least 90 degrees, one said panel being a sidewall panel, the other said panel having at least a portion located above the normal filling line of the container and a pouring opening incised in the inner ply of such portion, a pouring weir in said inner ply of said other panel and having a sill with a relieved portion, a resilient pouring lip fixed to said other panel in proximity to said weir so as to be traversed by the flow of fluid over said weir sill, said pouring lip being substantially coplanar with said outer ply and having a dimension measured laterally of said pouring opening at least equal to the lateral dimension of said relieved portion, said pouring lip also having a free downstream edge portion extending across and beyond said common score line, and a lift tab hinged to said outer ply of said other panel and initially disposed in overlying sanitarily protective relation with said pouring weir and said pouring opening, said resilient pouring lip being adapted upon elevation of said lift tab to flex so as to bring the free downstream edge on said pouring lip into spaced apart relation with both said side panel and said other panel.

2. A container panel structure of bendable sheet material such as paperboard and comprising, in combination, a pouring opening panel including a pouring weir defining at least a portion of a pouring opening, an adjacent underlying side panel separated from said pouring opening panel by a crease defining an angular corner, a relieved crest on said pouring weir, a resilient pouring lip mounted on the outside face of said panel which includes said pouring weir and susceptible of being traversed by the fluid dispensed over said relieved crest, and a free downstream edge on said resilient pouring lip disposed in spaced apart relation with both said panels.

3. A container panel structure of bendable sheet material such as paperboard and comprising, in combination, a pouring opening panel including an inside sub-panel of said material defining a pouring weir and a sanitarily protected pouring opening, said pouring opening panel also including an outer ply defining a reclosable lift tab initially disposed in overlying relation with the sanitarily protected pouring opening, an adjacent underlying side panel separated from said pouring opening panel by a crease defining an angular corner subtending an arc of at least 90 degrees, a relieved crest on said pouring weir, a flexible pouring lip mounted on the outside face of sub-panel which includes said pouring weir and susceptible of being traversed by the fluid dispensed over said relieved crest, said pouring lip being susceptible of springing from a flexed to a substantially unflexed condition upon initial elevation of said lift tab, and a free downstream edge on said pouring lip disposed in spaced apart relation with both said panels with said lip in an unflexed condition.

4. A container panel structure of bendable sheet material such as paperboard and comprising, in combination, a pouring opening panel including a pouring weir defining at least a portion of a sanitarily protected pouring opening, an adjacent underlying side panel separated from said pouring opening panel by a crease defining an angular corner, a resilient pouring lip mounted on the outside face of said panel which includes said pouring weir and susceptible of being traversed by the fluid dispensed over said pouring weir, and a free downstream edge on said resilient pouring lip disposed in spaced apart relation with both said panels.

5. A panel structure for a container of paperboard or the like which is self-sustaining in shape, said panel structure comprising, in combination, a pair of adjacent planar panels defined at least in part by an inner ply and an outer ply common to both, said panels being separated by a common score line, one said panel being a sidewall panel, the other said panel having at least a portion located above the normal filling line of the container and a pouring opening incised in the inner ply of such portion, an outboard edge defining one boundary of said pouring opening and having a relatively deep and narrow notch therein, a resilient pouring lip fixed to said other panel below said notch, the lateral dimension of said notch being shorter than said outboard edge, said pouring lip being substantially coplanar with said outer ply and having an area at least equal to that of said notch, a lift tab hinged to said outer ply of said other panel and initially disposed in overlying sanitarily protective relation with said pouring opening, and a free downstream edge on said resilient pouring lip disposed in spaced apart relation with both said side panel and said other panel upon elevation of said lift tab and flexure of said pouring lip.

6. A panel structure for incorporation into containers and blanks of bendable sheet material such as paperboard, said panel structure comprising, in combination, a first planar panel and a second planar panel separated therefrom by a crease, said panels being defined by an inner ply and an outer ply common to both, said first panel having a pouring opening in said inner ply and a pouring weir adjacent the pouring opening, said pouring weir having a relieved sill, a pouring lip having a relieved upstream edge portion and a projecting downstream edge portion, said pouring lip being adhesively sandwiched between said inner and outer plies in position to be traversed by the stream of fluid dispensed over said relieved sill, said downstream edge portion of said lip being excluded from adhesive juncture and terminating in a separation edge spaced from both said panels.

7. A panel structure for incorporation into containers and blanks of bendable sheet material such as paperboard, said panel structure comprising, in combination, a first planar panel and a second planar panel separated therefrom by a crease, said panels being defined by an inner ply and an outer ply common to both, said first panel having a pouring opening in said inner ply and a pouring weir adjacent the pouring opening, said pouring weir having a notched sill, a resilient pouring lip having a similarly notched upstream edge portion and a correspondingly shaped projecting downstream edge portion, said pouring lip being adhesively sandwiched between said inner and outer plies in position to be traversed by the stream of fluid dispensed over said relieved sill, and a lift tab hinged to said first panel and initially disposed in sealed overlying relation with said pouring opening and said resilient pouring lip, said downstream edge portion of said lip being excluded from adhesive juncture and terminating in a separation edge spaced from both said panels upon elevation of said lift tab.

8. A panel structure for containers and blanks of paperboard and the like, said structure comprising the combination of a first planar panel and a second planar panel adjacent thereto but separated therefrom by a crease, said first panel having a pouring opening and a pouring weir defining at least a portion of said opening, said pouring weir having a relieved sill, a resilient pouring lip adhesively fixed to said first panel in position to be traversed by the stream of fluid dispensed over said relieved sill, said resilient pouring lip having an upwardly crimped downstream edge portion terminating in a free separation edge spaced from both said panels, said crimped edge portion being free of adhesive juncture.

9. A panel structure for containers and blanks of paperboard and the like, said structure comprising, in combination, a first planar panel and a second planar panel adjacent thereto but separated therefrom by a crease, said panels being defined by an inner ply and an outer ply, said first panel having in its inner ply a pouring opening and a pouring weir defining at least a portion of said opening, said pouring weir having a relieved sill, a lift tab severably attached to the outer ply of said first panel and initially disposed in sealed overlying relation with said pouring opening and said weir, a resilient pouring lip adhesively fixed to said first panel in position to be traversed by the fluid dispensed over said relieved sill and surrounded entirely by the inside face of said lift tab, said resilient pouring lip having an upwardly crimped downstream edge portion terminating in a free separation edge spaced from both said panels upon elevation of said lift tab, said crimped edge portion being free of adhesive juncture.

10. In a blank for a container of paperboard or the like, the combination comprising two adjacent planar panels defined at least in part by an inner ply and an outer ply common to both, said panels being separated by a common score line, one said panel being a sidewall panel, the other said panel having at least a portion adapted to be located above the normal filling line of the container and a pouring opening incised in the inner ply of such portion, a pouring weir in said inner ply of said other panel and having a sill with a relieved portion, an increased resilient pouring lip fixed to said other panel in proximity to said weir and adapted to be traversed by the flow of fluid over said weir sill, said pouring lip being substantially coplanar with said outer ply and having a dimension measured laterally of said pouring opening at least equal to the lateral dimension of said relieved portion, said pouring lip also having a free downstream edge portion extending across and beyond said common score line, and a lift tab hinged to said outer ply of said other panel and disposed in overlying sanitarily protective relation with said pouring weir and said pouring opening, the free downstream edge on said pouring lip being normally disposable in spaced apart relation with both side panel and said other panel.

References Cited in the file of this patent

UNITED STATES PATENTS

| | | |
|---|---|---|
| 1,261,260 | Meares | Apr. 2, 1918 |
| 2,263,957 | Sooy | Nov. 25, 1941 |
| 2,288,914 | Monroe | July 17, 1942 |
| 2,353,521 | Steffens | July 11, 1944 |
| 2,531,630 | Jones | Nov. 28, 1950 |
| 2,533,305 | Wells | Dec. 12, 1950 |
| 2,601,399 | Jones | June 24, 1952 |